United States Patent
Wang et al.

[19]

[11] Patent Number: 6,035,055
[45] Date of Patent: *Mar. 7, 2000

[54] DIGITAL IMAGE MANAGEMENT SYSTEM IN A DISTRIBUTED DATA ACCESS NETWORK SYSTEM

[75] Inventors: John Y. A. Wang; HongJiang Zhang, both of Mountain View, Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/963,234

[22] Filed: Nov. 3, 1997

[51] Int. Cl.$^7$ ..................................................... G06K 9/00
[52] U.S. Cl. .......................... 382/118; 382/190; 382/157
[58] Field of Search ..................................... 382/118, 192, 382/193, 194, 201, 202, 205, 206, 208, 157, 190, 228; 356/71; 348/15

[56] References Cited

U.S. PATENT DOCUMENTS

| | | | |
|---|---|---|---|
| 5,164,992 | 11/1992 | Turk et al. | 382/118 |
| 5,438,357 | 8/1995 | McNelley | 348/15 |
| 5,450,504 | 9/1995 | Calia | 382/118 |
| 5,546,475 | 8/1996 | Bolle et al. | 382/190 |
| 5,710,833 | 1/1998 | Moghaddam et al.g | 382/228 |
| 5,719,951 | 2/1998 | Shackleton et al. | 382/118 |
| 5,815,252 | 9/1998 | Price-francis | 356/71 |
| 5,850,470 | 12/1998 | Kung et al. | 382/157 |
| 5,852,669 | 12/1998 | Eleftheriadis et al. | 382/118 |

OTHER PUBLICATIONS

The Computer Science and Engineering Hand Book, by Allen B. Tucker, Jr., pp. 1193–1199, 1997.
"QBIC (TM)—IBM's Query By Image Content", 1995, pp. 1–2, QBIC Home Page.
Rowley et al., "Human Face Dectection in Visual Scenes", 1995, Carnegie Mellon Computer Science Technical Report CMU–CS–95–158R.

*Primary Examiner*—Amelia Au
*Assistant Examiner*—Vikkram Bali
*Attorney, Agent, or Firm*—Thomas X. Li

[57] ABSTRACT

A digital image management system is described that includes a content analyzer that analyzes an image to extract content data from the image. The content data of an image include face feature data. The digital image management system also includes an image database that is coupled to the content analyzer to store pixel data of each of a number of images and the content data of each of the images. A search engine is also provided in the digital image management system. The search engine is coupled to the image database and the content analyzer to compare the content data of the images with that of an input image such that any image similar to the input image can be identified from the image database without retrieving the pixel data of the image from the image database. A method of extracting feature data of a face in an image is also described.

7 Claims, 6 Drawing Sheets

LOGICAL MEMORY MAP OF
THE IMAGE DATABASE

DIGITAL IMAGE MANAGEMENT SYSTEM IN A DISTRIBUTED DATA ACCESS NETWORK SYSTEM

BACKGROUND OF THE INVENTION

1. Field of the Invention

The present invention pertains to digital image management. More particularly, this invention relates to a digital image management system that automatically extracts content information from digital images and associates the content information with the digital images such that the digital images can be effectively and efficiently searched and retrieved.

2. Description of the Related Art

As is known, photographic prints have traditionally been used for visual presentation. The photographic prints are desirable because photographic papers are relatively inexpensive and easily portable. However, when a viewer needs to locate a desired photographic picture among a large number of pictures, the viewer has to individually view each of the pictures until the desired picture is identified. This is typically a very time consuming process. The process can also be very frustrating especially when the desired picture needs to be identified quickly.

In order to reduce the time one needs to find the desired picture among a large number of pictures, the pictures can be organized into a number of different categories. The organization typically involves labeling containers that store the pictures and building index lookup tables so that the viewer can locate the appropriate container or containers for the desired category relatively quickly. The disadvantage of this prior art approach is that a lot of time is typically spent on categorizing the pictures and arranging them according to their categories. Moreover, even with this approach, the task of searching for the desired picture is still time consuming and difficult. The viewer needs to remember which picture belongs to which category in order to find the desired picture. The viewer also needs to go through the pictures within the desired category in order to identify the desired picture. Furthermore, each picture is assigned to one category.

In addition, this prior art image management system may not function properly if pictures are misplaced or miscategorized. When this occurs, the desired picture may not be identified unless all or most of the pictures have been viewed. In this case, more time is needed to find the desired picture.

With the advance of computer technologies, it is now possible to store an image in a computer system. This can be done using a scanner that converts the image on a print or film into a digital image. The digital image includes image pixels (or dots) arranged in a matrix. The data for each image pixel are then stored in the computer. The digital image can be retrieved for display from the computer. The digital image can also be digitally altered in the computer. Moreover, the digital image can be transmitted to a remote computer for viewing via a communication network. This allows real time viewing of the image.

However, searches of these digital images based on their image contents in the computer are still nearly impossible. In order to identify a desired image stored in the computer, the computer can only compare the image pixel data of an input image with the corresponding pixel data of each of the images stored in the computer. The comparison typically takes a very long time to complete and uses a lot of system resources (e.g., memory and communication bandwidth). This is because the computer has to compare each image pixel data of the input image with the corresponding image pixel data of each of the stored images. A match occurs when each pixel data of the input image is similar the corresponding pixel data of a stored image. Using this method, unless the two compared images are very similar, it is very difficult to find a match between any two images. This is especially true because noise and other positional errors may be introduced into the image data during scanning.

SUMMARY OF THE INVENTION

One feature of the present invention is to allow image search and retrieval in a data processing system.

Another feature of the present invention is to provide a digital image management system that automatically extracts and stores content data of digital images such that effective and efficient search and retrieval of the digital images can be achieved.

A further feature of the present invention is to allow efficient image search and retrieval in a distributed data access network system.

A digital image management system is described that includes a content analyzer that analyzes an image to extract content data from the image. The content data include face feature data. The digital image management system also includes an image database that is coupled to the content analyzer to store pixel data of each of a number of images and the content data of each of the images. A search engine is also provided in the digital image management system. The search engine is coupled to the image database and the content analyzer to compare the content data of the images stored in the image database with the content data of an input image such that any image similar to the input image can be identified from the image database without retrieving the pixel data of the image from the image database.

A method of extracting feature data of a face in an image is also described. The method first detects if the image contains the face using a neural network-based face detection system. Then the feature data of the face are computed using a principle component analysis system.

In addition, the digital image management system can be implemented in a distributed data access network system that includes a number of data service systems. In this case, the content analyzer is located within one of the data service systems and the image database includes a number of databases, each being located within one of the data service systems. The search engine may include a number of search and retrieval engines, each being located within one of the data service systems.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
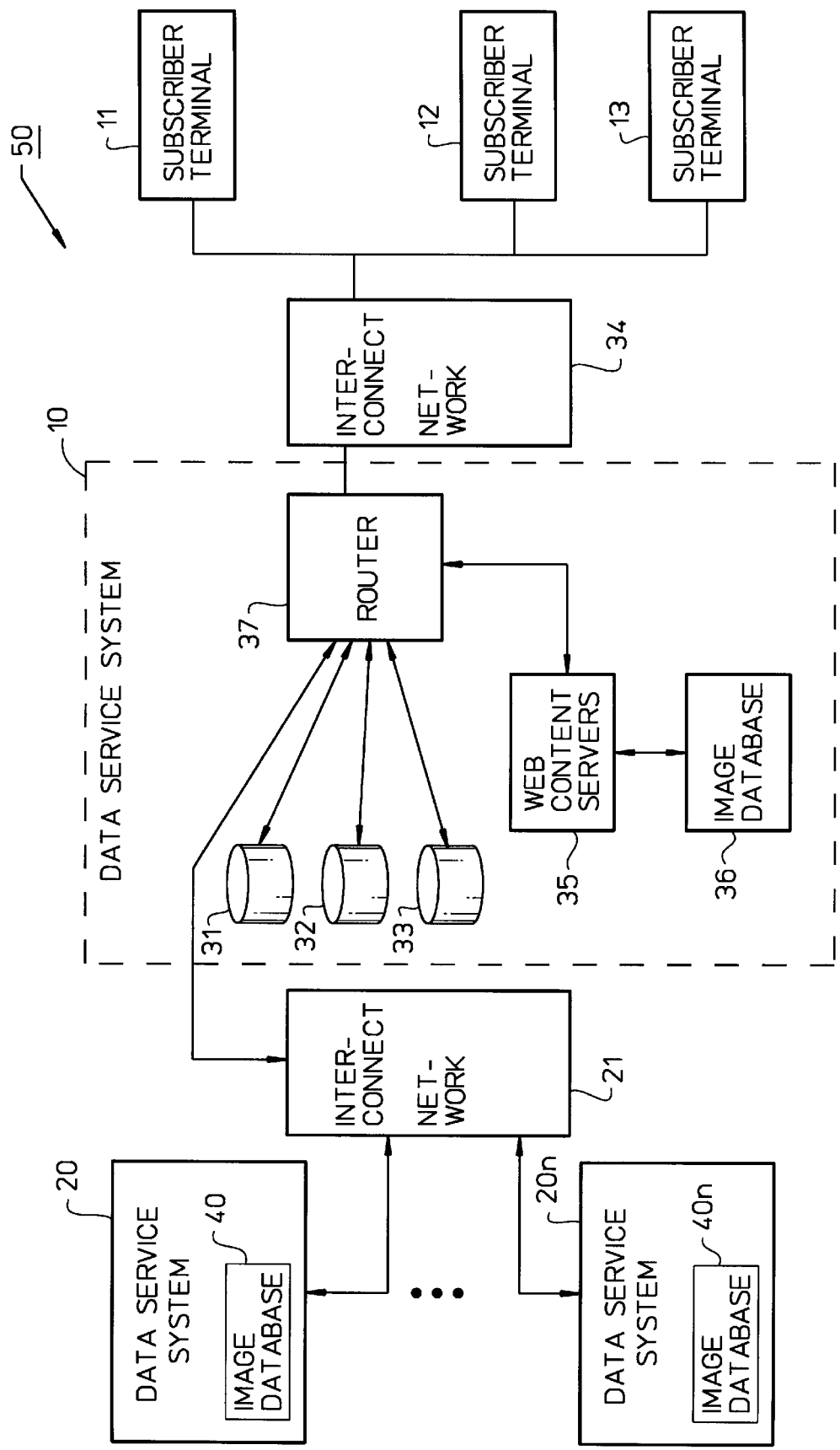
FIG. 1 shows a distributed data access network system that has a number of data service systems, each of which having an image database that is part of a digital image management system in accordance with one embodiment of the present invention.

FIG. 1 shows a data access network system 50 within which a digital image management system 100 (shown in FIG. 3 in block diagram form) in accordance with one embodiment of the present invention is implemented. The image management system 100 automatically extracts content data from digital images to allow the digital images stored in image databases of the data access network system 50 to be effectively and efficiently searched and retrieved. The content data include face feature data and other kinds of image content data. When the image management system 100 is implemented in a distributed network system, some of the components or modules of the image management system 100 include functionally identical units, each being within an individual system of the distributed network system.

Alternatively, the image management system 100 can be implemented within other kind of systems. For example, the image management system 100 can simply be implemented in a single computer system. Furthermore, the image management system 100 can be implemented in a computerenabled DVD (Digital Versatile Disc) browser/player, a computer-enabled camera or scanner, or other kinds of appliances.

As will be described in more detail below and in accordance with one embodiment of the present invention, the image management system 100 allows content-based image search, querying, and browsing. The image management system 100 allows automatic extraction of content data of digital images. This allows the digital images to be efficiently and effectively searched in accordance with their content information. This also minimizes the effort required to catalog the digital images with respect to their contents. In other words, the image management system 100 effectively provides a user with access to a very large set of content-searchable images.

The image management system 100 analyzes an image to extract the content data from the image with a content analyzer 102. The content data of the image include color data of the image, texture data of the image, face feature data of the image, shape and position data of objects within the image, and other feature data of the image. In addition, the content data may also include text description data of the image. The content data can be referred to as meta-data. The content analyzer 102 extracts the face feature data by first detecting if the image contains one or more faces using a face detection system 201 (see FIG. 4). Then the content analyzer 102 computes the feature data of each of the faces in the image using a face feature extraction system 202 (see FIG. 4).

The content data of an image are then stored in one of the image databases (e.g., the image databases 36 and 40 through 40n of FIG. 1) of the image management system 100, in association with the pixel data of the respective image. The content data and the pixel data of a particular image may be stored in different image databases. When this occurs, the logical links (e.g., hyper-links) between the content data and the pixel data are stored into one of the image databases. The content analyzer 102 performs this function using a linking system 204 (see FIG. 4).

When the image management system 100 receives an image for browsing, querying, or comparison, the content data of the new image are extracted and compared with that of the images stored in the image databases of the image management system 100 based on a predetermined similarity measure such that any image similar to the input image can be identified from the image databases without viewing the images. The search results can be ranked, for example, according to similarity scores.

In addition, the image management system 100 can receive the content data (instead of the actual image) to search for any image stored in the image databases of the system 100 that has similar content data. The comparison is done by a search engine 104 of the image management system 100. In one embodiment, the search engine 100 retrieves the pixel data of the similar images after the search is completed. In another embodiment, the search engine 104 only retrieves the content data of the similar images to produce the ranked list. In this case, the search engine 104 retrieves the pixel data of the similar images only when display of the images is requested by the user.

Moreover, the image management system 100 also includes a labeling capability that allows the user to associate personal information (e.g., name) with a face in an image. This is done by an auto-annotation module 107 of the image management system 100. The image management system 100 will be described in more detail below, also in conjunction with FIGS. 1–6.

Referring now to FIG. 1, the data access network system 50 that embodies the digital image management system 100 is described in more detail. In one embodiment, the data access network system 50 is a distributed or federated network system that spans multiple independently administrated control domains. This means that the system 50 is an open system that includes different administrative entities cooperating together as a network. Alternatively, the data access network system 50 can have other network architectures. For example, the data access network system 50 may be a closed network system.

The data access network system 50 includes a number of data service systems 10 and 20 through 20n that are connected together via an interconnect network 21. Each of the data service systems 10 and 20–20n can be an Internet/Intranet service system in one embodiment. This means that each of the data service systems 10 and 20–20n contains the same logical structure. Therefore, only the data service system 10 will be described in more detail below.

The data service system 10 is further connected to subscriber sites 11–13 via an interconnect network 34. Included in the data service system 10 are a router 37, content servers 35, proxy servers 31, DNSs (Domain Name Servers) 32, and DHCP (Dynamic Host Configuration Protocol) servers 33. The router 37 is used for routing data to and from the subscriber sites 11–13 upon receiving a request from a subscriber/user. The router 37 also directs data traffic to the appropriate servers 31–33 and 35, or to the other data service systems 20–20n. The content servers 35 support a variety of Internet applications, including World Wide Web access, electronic mail, bulletin boards, news groups and FTP access. The proxy servers 31 may be used to enhance security of accesses to and from the subscriber sites 11–13, as well as to speed up Internet access to other data service systems 20–20n from the data service system 10 by caching frequently accessed data locally. All of the servers 31–33 and 35 are well known in the art.

The data service system 10 can be implemented by a single computer system or a number of computer systems connected together. When the data service system 10 is implemented by a single computer system, each of the components 31–33 and 35–37 is within the computer system. When the data service system 10 is implemented by a number of computer systems, each computer system can include one or more of the components 31–33 and 35–37.

The data service system 10 provides, for example, Internet or Intranet service to subscriber sites 11 through 13 via the interconnect network 34. This means the data access network system 50 is an Internet or Intranet network system. FIG. 1 only shows the subscriber sites 11–13 for illustration purposes. In practice, many more sites may be connected to the data service system 10.

The subscriber sites 11–13 may include terminals of subscribers/users located at the residences, schools, or offices of the subscribers/users. The interconnect network 34 can be any known network. For example, the interconnect network 34 can be the telephone network system.

Each of the subscriber sites 11–13 may include a personal computer, a network computer, a notebook computer, a workstation, a mainframe computer, a supercomputer, or any other type of data processing system. Moreover, each of the subscriber sites 11–13 may be a multi-media web TV or a web-enabled smart video player or scanner.

As can be seen from FIG. 1, each of the data service systems 10 and 20–20n includes an image database. For example, the data service system 10 includes the image database 36 and the data service system 20 includes the image database 40. The image databases 36 and 40–40n are part of the image management system 100 of FIG. 3 when the image management system 100 is implemented within the data access network system 50.

Figure 2:
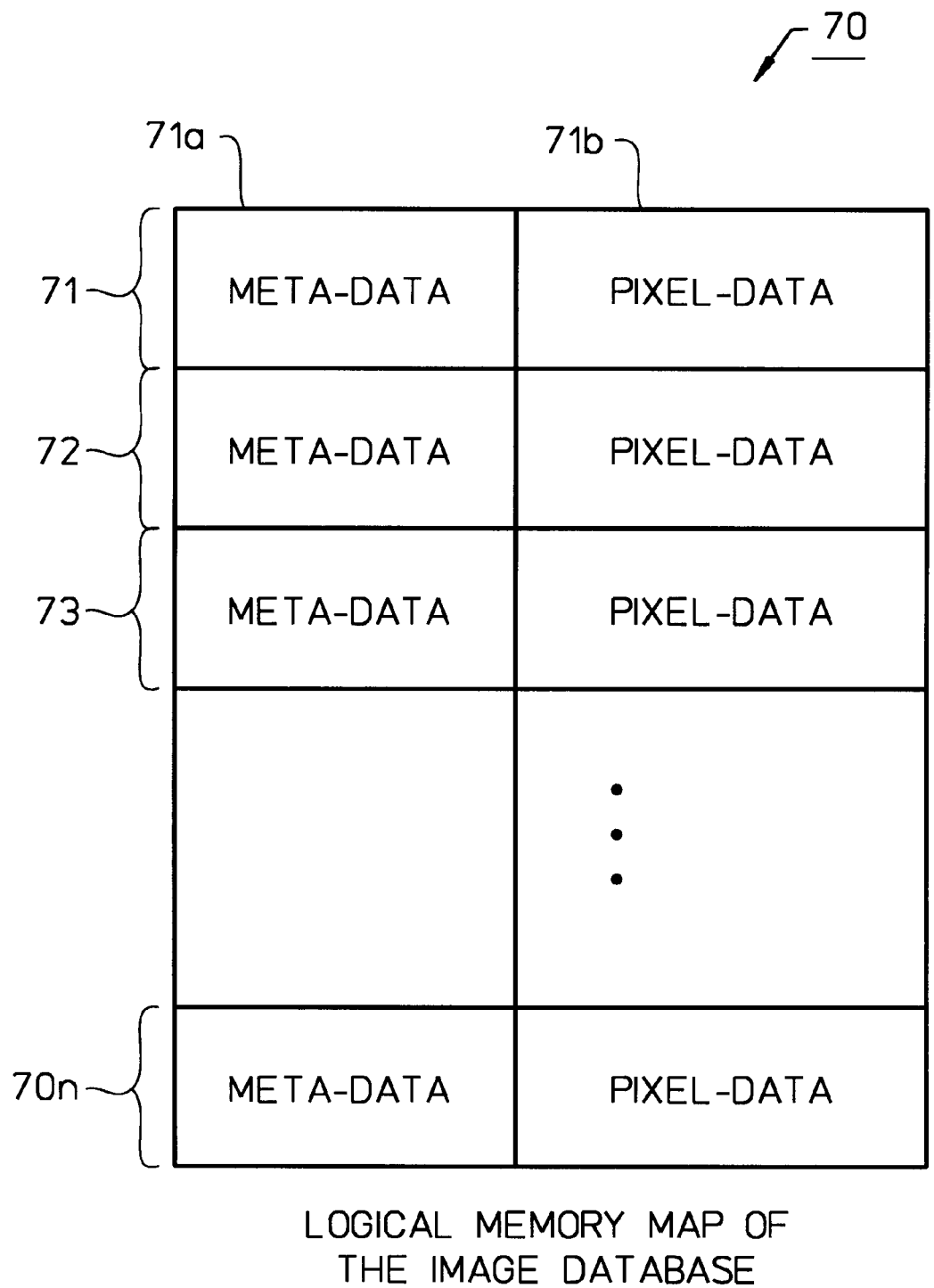
FIG. 2 shows the data format of the digital images and their content data stored in each of the image databases.

Each of the image databases 36 and 40–40n can be accessed from, for example, one of the subscriber sites 11–13 via the content servers of the respective data service system. Each of the image databases 36 and 40–40n stores a number of digital images and their content data. Each of the digital images stored is, for example, in the pixel matrix format in the respective image database. The content data of each image are associated with the respective digital image stored in the image database, but are not necessarily physically stored adjacent to the respective image in the image database. FIG. 2 shows the logical memory map 70 for the digital images stored in any of image databases 36 and 40–40n.

As can be seen from FIG. 2, the logical memory map 70 includes a number of entries 71–70n, each for storing one digital image. Each entry (e.g., the entry 71) includes a content data field (e.g., the content data field 71a) and an image field (e.g., the image field 71b). The content data field of each entry stores the content data of a digital image and the image field stores the image data of the digital image. The content data field of an entry is associated or linked to the image field of that entry.

Figure 3:
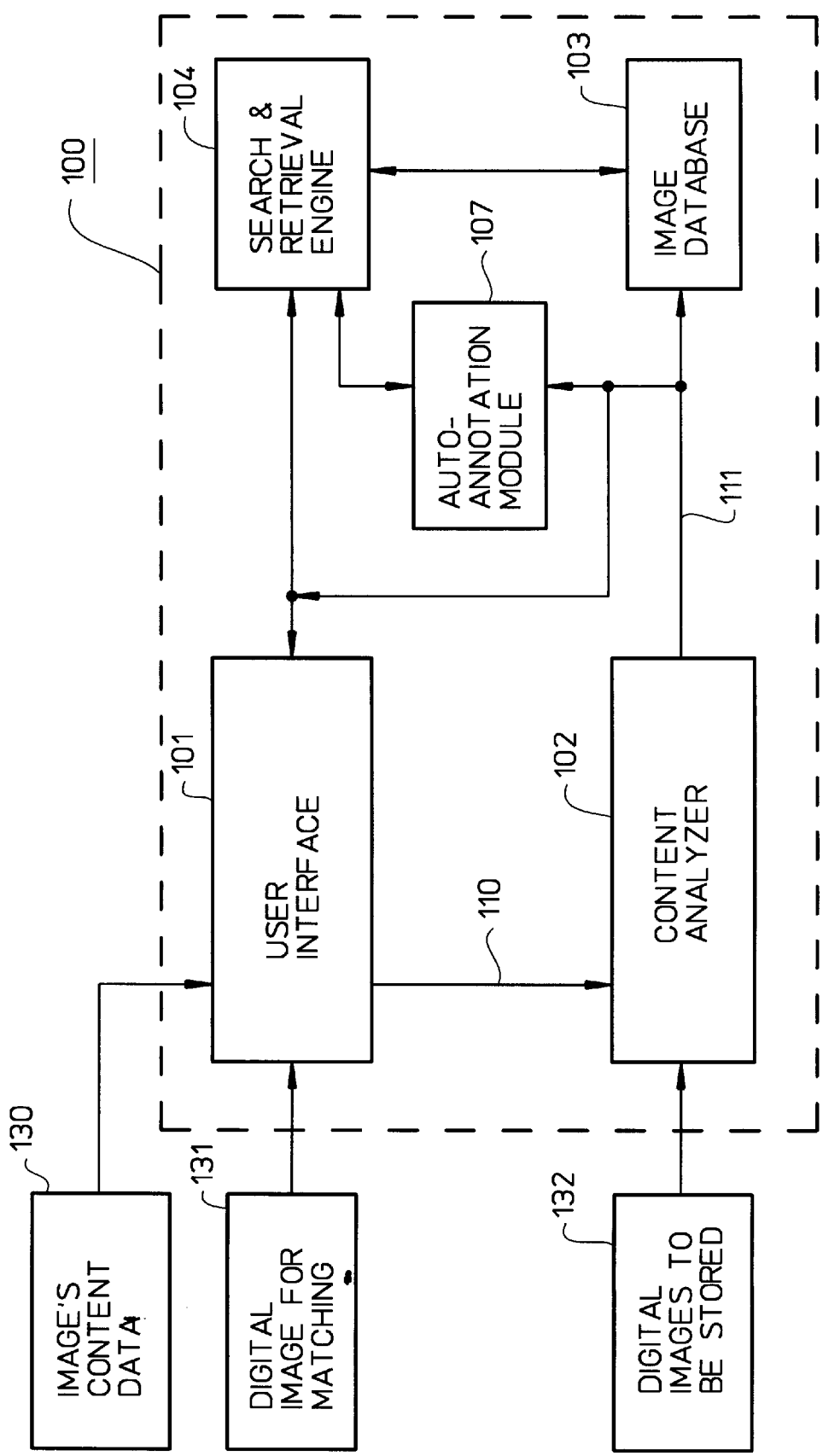
FIG. 3 is a block diagram of the digital image managing system in accordance with one embodiment of the present invention.

Referring back to FIG. 1, because the data service systems 10 and 20–20n are connected together, a subscriber site connected to any of the data service systems 10 and 20–20n can access and retrieve the digital images stored in any of the image databases 36 and 40–40n. Because each digital image stored in an image database of the databases 36 and 40–40n contains both its pixel data and content data, the user at the subscriber site may only retrieve the content data, the pixel data, or both from the respective image database. This means when the image management system 100 of FIG. 3 is implemented in the data access network system 50, the search and retrieval are effective and efficient because only the content data of digital images need to be downloaded from one of the image databases 36 and 40–40n. The image management system 100 will be described in more detail below, also in conjunction with FIGS. 3–6.

Referring now to FIG. 3, the image management system 100 includes a user interface 101 and an image database 103, in addition to the content analyzer 102 and the search and retrieval engine 104. The image database 103 collectively represents the image databases 36 and 40–40n of FIG. 1 when the image management system 100 is employed in the data access network system 50.

In one embodiment, each of the components 101–102 and 104 is a functional component and is implemented by software. In another embodiment, each of the components 101–102 and 104 can be discrete hardware or firmware module.

Referring to FIGS. 1 and 3, when the image management system 100 is implemented in the data access network system 50, the image database 103 and the search engine 104 are implemented in each of the data service systems while the user interface 101 and the content analyzer 102 are implemented in a subscriber site (e.g., the subscriber site 11) in one embodiment. In another embodiment, all components except the image database 103 are implemented in a subscriber site. Alternatively, all components of the image management system 100 except the user interface 101 can be implemented in one of the data service systems (e.g., the data service system 10) of the data access network system 50 while the user interface 101 is implemented in the subscriber site.

Figure 4:
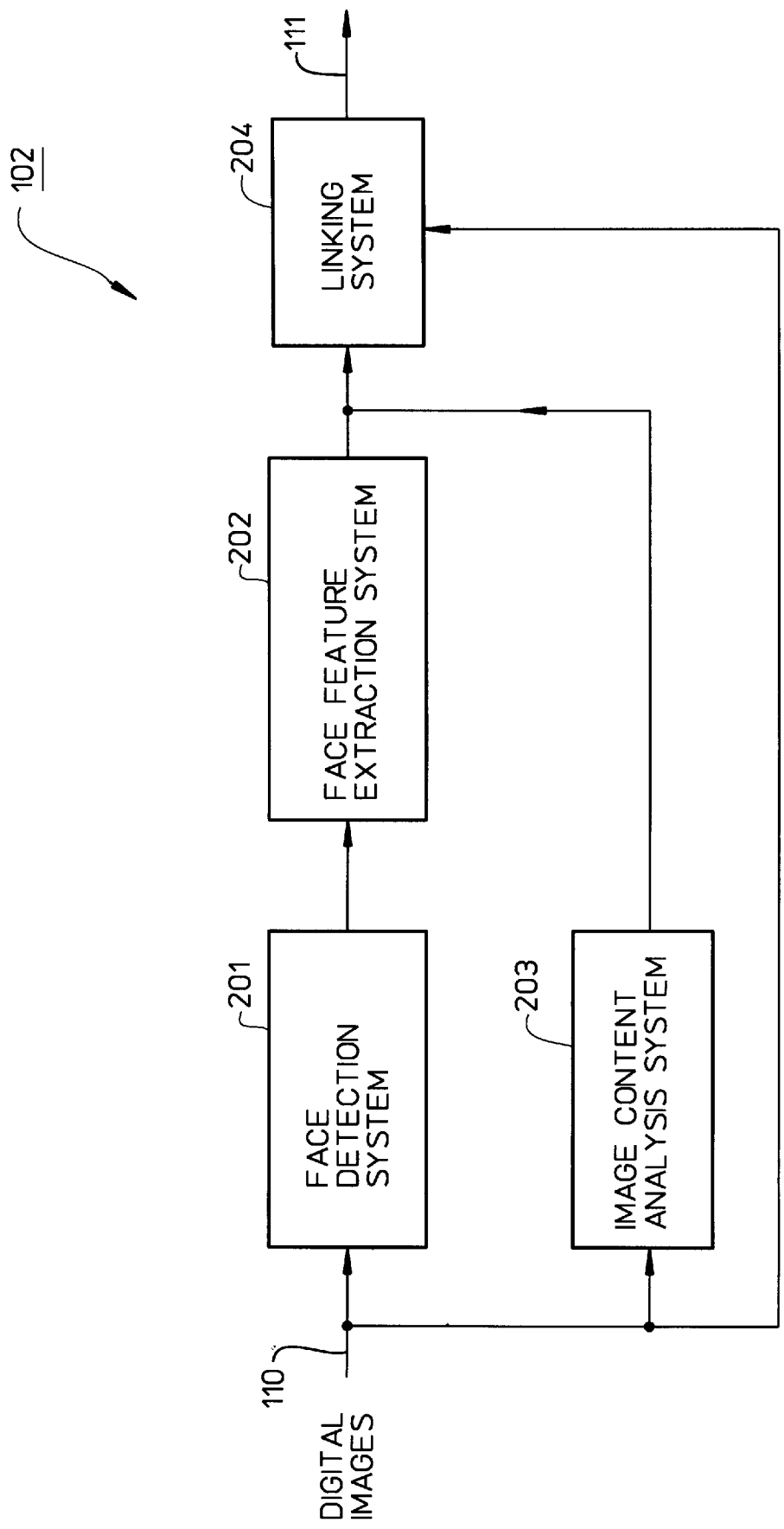
FIG. 4 shows the content analyzer of the digital image management system of FIG. 3, wherein the content analyzer includes a face detection system and a face feature extraction system.

Referring to FIG. 3, the content analyzer 102 is connected to the user interface 101 and the image database 103. The user interface 101 is also connected to the search and retrieval engine 104. The search and retrieval engine 104 is in turn connected to the image database 103. The search and retrieval engine 104 is also connected to the auto-annotation module 107. The content analyzer 102 is used to analyze each digital image it receives to extract content information from the image. The content analyzer 102 also stores the logical link (e.g., hyper-link) information between the content data and the pixel data of an image into the image database 103 if the content data and the pixel data of the image are stored in separate locations or databases of the image database 103. FIG. 4 shows in more detail the content analyzer 102, which will be described in more detail below.

Referring again to FIG. 3, the content analyzer 102 receives the digital images 132 to be stored in the image database 103. The content analyzer 102 can also receive the digital image 131 from the user interface 101. The digital images 132 are fed to the content analyzer 102 from, for example, a storage means (not shown in FIG. 3). The digital images 132 can be acquired by scanning photos or pictures using a scanner, or by a digital camera. In one embodiment, the content analyzer 102 receives one digital image at one time. In an alternative embodiment, the content analyzer 102 can receive and process a number of digital images at the same time.

The user interface 101 is an interactive user interface that is part of an interactive window interface. The user interface 101 includes a window (not shown) that displays the digital image 131 or the content data 130. The image management system 100 uses the digital image 131 to search for any similar images stored in the database 103. When the content data 130 are used for the search instead of the digital image 131, the image management system 100 searches the image database 103 for any image having similar content data to the content data 130. When the content data 130 are associated with the digital image 131, the image management system 100 can use the content data 130 to directly search the database 103.

The user interface 101 also displays the search results (e.g., the digital images that are found to be similar based on the similarity scores). In addition, the user interface 101 also includes a number of command or function buttons that can be activated using a user input device (e.g., mouse).

If the digital image 131 includes a number of faces, the user interface 101 allows the user to select one of the faces in the image 131 for processing. This allows the content analyzer 102 to compute the content data of the selected face or select the associated face meta-data from the content data 130. The search and retrieval engine 104 then searches for any images stored in the database 103 that contains faces similar to the selected face in the digital image 131. The face selection can be done by the user using the user input device in a conventional way.

In addition, the user interface 101 also allows display of multiple images and retrieval based on faces present in those multiple images. In this case, the user interface 101 allows the user to select and combine faces from different images displayed for the search. For example, the user can, through the user interface 101, select faces in different images and combine the selected faces together for a boolean search (i.e., at least one, AND, or OR).

Once the user selects the desired function or operation, the user interface 101 notifies the corresponding components for the appropriate operation. The user interface 101 can be implemented by any known interactive user interface technology.

The user interface 101 receives the digital image 131 (or a number of images) to be searched. The digital images 131 can be acquired by scanning photos or pictures using a scanner, or by a digital camera. This means that the user interface 101 is connected to an image capturing device (e.g., a scanner or digital camera)(not shown in FIG. 4). The user interface 101 can also receive the content data 130 of an image.

The search and retrieval engine 104 is used to receive the content data of a digital image and uses the content data to search the image database 103 for images with the same or similar content data. As described above, the content data include face feature data, color data, texture data, shape and position data, and/or text description data of the image.

In one embodiment, the search and retrieval engine 104 uses the face feature data to search for images stored in the image database 103 having similar face feature data. In another embodiment, the search and retrieval engine 104 combines the face feature data with other kinds of the content data (e.g., the color data, texture data, shape and position data, and/or text description data) to search for images stored in the image database 103.

In one embodiment, the search and retrieval engine 104 only uses one kind feature data (e.g., the face feature data or the color and texture feature data) to search for the similar images. In another embodiment, the search and retrieval engine 104 combines the face feature data with all other feature data of the content data for the search.

In one embodiment, the search and retrieval engine 104 retrieves the content data of all digital images from the image database 103 into the engine 104. The search and retrieval engine 104 then compares the content data with the content data of the digital image 131 or the content data 130 to output similarity scores between the two content data based on the predetermined similarity measure. In one embodiment, the similarity measure includes a set of thresholds and the content data include a set of values. The comparison of the corresponding values of two content data yields differences between the values of the two content data. The differences are then compared against their corresponding thresholds. A similarity score is obtained based on how many of the differences are less or more than the thresholds. The search and retrieval engine 104 can be any kind of known search engine.

In one embodiment, the search and retrieval engine 104 retrieves both the content and pixel data of the similar images for display after a search. In another embodiment, the search and retrieval engine 104 selectively retrieves the similar images in accordance with their similarity scores. In a further embodiment, the search and retrieval engine 104 retrieves the pixel data of the similar images only when display of these images is requested.

In addition, the search and retrieval engine 104 may include a number of search and retrieval engines, each of which is located in one of the data service systems 10 and 20–20n (FIG. 1). When this is the case, the search engine 104 allows retrieval of the pixel data of the similar images stored in the local image database of the image database 103 while allowing the retrieval of only the content data of the similar images stored in the external image databases of the image database 103 into the local data service system.

When one of the digital images 132 is to be stored in the image database 103, the image is sent to the content analyzer 102 to extract the content data from the image. The image and its content data are linked together and stored in the image database 103. When the digital image 131 is received in the user interface 101, the user interface 101 first sends the image 131 to the content analyzer 102 to extract the content data from the digital image 131. The content data are sent to the search and retrieval engine 104 to be compared with the content data stored in the image database 103. The references to the content data matching the content data of the digital image 131 are then sent back to the user interface 101. The user can then decide whether to view those images associated with those content data. If the user interface 101 receives the image content data 130 (i.e., content query) instead of the digital image 131, the user interface 130 directly sends the content data 130 to the search and retrieval engine 104.

The image management system 100 also includes an auto-annotation module 107 that is connected to the search and retrieval engine 104. The auto-annotation module 107 associates personal information (e.g., name) of a first face within a first image already stored in the image database 103 with a second image having a second face that is found to be similar to the first face. The faces are found similar because, for example, they have matching or similar face feature data. This allows linking of images having different "faces" of the same person. After the auto-annotation module 107 links the personal information with the second image, the second image may then be stored in the image database 103.

The image management system 100 simplifies the management of digital images, resulting a large set of content-indexed images. It also provides efficient and effective search and retrieval for digital images. This, for example, reduces the time of finding a desired image for printing or transmission to a remote site for viewing. In other words, the image management system 100 greatly simplifies the access to available images. In addition, the image management system 100 provides a virtual distributed image database.

FIG. 4 shows the structure of the content analyzer 102. As can be seen from FIG. 4, the content analyzer 102 includes a face detection system 201, a face feature extraction system 202, and an image content analysis system 203. In addition, the content analyzer 102 also includes a linking system 204 that associates the extracted content data with the respective digital image. The linking system 204 provides the logical linking information between the content data of an image and the pixel data of the image. The logical linking information can be, for example, hyper-links. In this case, the content data and the pixel data of the image can be stored in different locations within a database, or even in different databases of the image database 103. Alternatively, the content analyzer 102 does not include the linking system 204. In this case, the linking or association function is performed in the image database 103 where the image and its content data are stored.

The face detection system 201 is connected to receive the digital images 132 and the digital image 131 via the user interface 101 of FIG. 3. The face detection system 201 detects if the digital image received contains any face. If the image contains a number of faces, the detection system 201 detects each of the faces. The face detection system 201 detects the eye locations of a face if the image contains the face. The image data and the faces' eye location data are sent to the face feature extraction system 202 to compute the face feature data of the detected face. The face feature data are also referred to as face coefficient data. When multiple faces are detected, the face feature extraction system 202 extracts the face feature data of each of the faces and the respective data are associated with that face in that image.

In one embodiment, the face detection system 201 is a neural network-based face detection system disclosed in a publication entitled HUMAN FACE DETECTION IN VISUAL SCENES, by H. Rowley (har@cs.cmu.edu), S. Baluja (baluja@cs.cmu.edu), and T. Kanade (tk@cs.cmu.edu) in November 1995. The publication is available from Carnegie Mellon University's Internet site at "www.ius.Cs.cmu.edu/IUS/har2/har/www/CM U-CS-95-158R/." Alternatively, other known face detection systems may be used for the face detection system 201.

When the face detection system 201 is the neural network-based face detection system, the face detection system 201 detects if the image contains any face by first applying a set of neural network-based filters to the image. The filters examine each location in the image at several scales, looking for locations that might contain a face (i.e., looking for eye locations). The face detection system 201 then uses an arbitrator to combine the filter outputs. The arbitrator is used to merge detections from individual filters and eliminate overlapping detections. Using the neural network-based face detection system as the face detection system 201 makes the face detection robust, relatively fast, and detect most faces. In addition, it allows the face detection system 201 to detect different kinds of faces with different poses and lightings.

Once a face is detected from an image, the image and the eye locations of the face are sent to the face feature extraction system 202. In one embodiment, the face feature extraction system 202 is implemented by a face feature extraction system described in U.S. Pat. No. 5,164,992, dated Nov. 17, 1992, and entitled FACE RECOGNITION SYSTEM. Alternatively, other known face feature extraction systems may be used.

The face feature extraction system 202 extracts the face feature data from the detected face. The face feature extraction system 202 does this by first normalizing, warping (i.e., rotating and scaling), and masking the face to produce a reference face that has a set of predetermined eye locations. This means that through normalizing, warping, and masking of the detected face, the eyes of the detected face are mapped into the predetermined eye locations of the reference face. This is done by translating, scaling, and rotating the detected face and by adjusting the brightness and contrast of the detected face. In other words, this is to standardize or normalize the detected face. This is disclosed in the above-mentioned U.S. Pat. No. 5,164,992.

Then the face feature extraction system 202 projects the standardized face into an Eigen face space to compute the face coefficients of the detected face. This is also disclosed in the above-mentioned U.S. Pat. No. 5,164,992.

Figure 5:
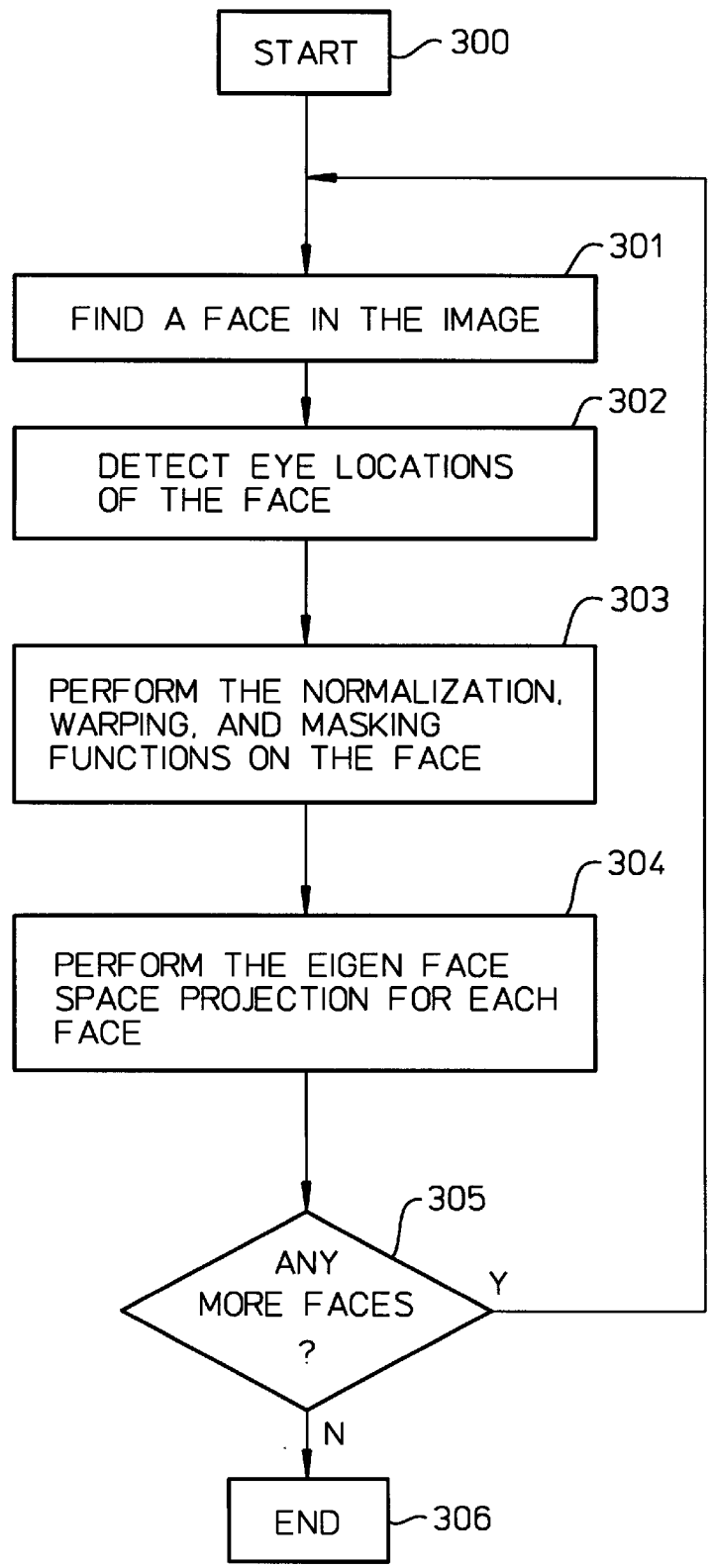
FIG. 5 shows the flow chart diagram of the process of detecting faces in an image and extracting face feature data from each of the faces detected by the face detection system and the face feature extraction system of FIG. 4.

FIG. 5 shows the process of detecting faces in an image and extracting the face feature data from the detected face by the face detection system 201 and the face feature extraction system 202 of FIG. 4. As can be seen from FIG. 5, the steps 301 and 302 are performed by the face detection system 201 of FIG. 4 and the steps 303 and 304 are performed by the face feature extraction system 202 of FIG. 4. At the steps 301–302, the face detection system 201 detects if the image contains a face and, if so, the eye locations of the face. At the step 303, the face feature extraction system 202 of FIG. 4 performs the normalization, wrapping, and masking functions on the detected face. This essentially maps the detected face into a reference face such that the eyes of the detected face are mapped into the predetermined eye locations of the reference face.

Referring back to FIG. 4, the digital image applied to the face detection system 201 is meanwhile also applied to the image content analysis system 203. The image content analysis system 203 analyzes the image and extracts visual content data from the digital image. The visual content data include color, texture, shape, and position data of the content data. The color and texture data indicate properties such as color percentages, color layout, color histogram, color moment, color coherence, texture compactness, texture contrast, texture directionality, texture periodicity, and texture homogeneity. In one embodiment, the image content analysis system 203 is implemented by a QBIC(™) (Query By Image Content) system manufactured and sold by IBM Corporation of Armonk, New York. The QBIC(™) system can be downloaded from IBM's world wide web site at "wwwqbic.almaden.ibm.com." Alternatively, the image content analysis system 203 can be implemented by other known color and texture extraction systems.

In one embodiment, the image content analysis system 203 also receives text description data of the image from the user interface 101 (FIG. 3). The text description data are supplied by the user through the user interface 101. The content analysis system 203 adds the text description data into the content data.

The image and its extracted content data from the image content analysis system 203 and the face feature extraction system 202 are then sent to the linking system 204 such that they can be associated with each other before being stored in the image database 103 of FIG. 3, or being sent to the search and retrieval engine 104. As described above, the linking system 204 also provides the logical linking information of the content data and the pixel data of the image when they are stored at separate locations.

Figure 6:
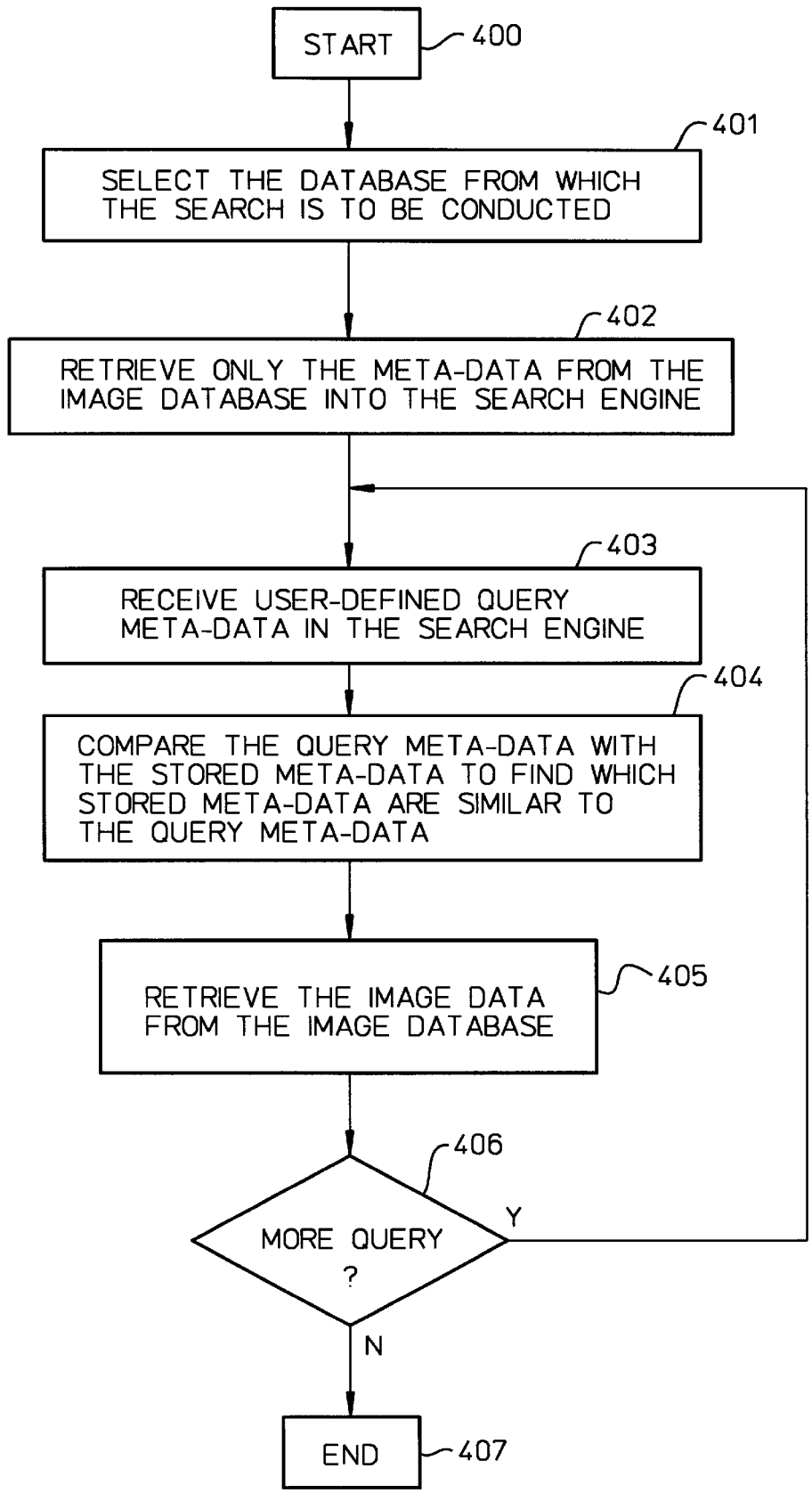
FIG. 6 shows the flow chart diagram of the process of searching and retrieving images from the image database by the search and retrieval engine of FIG. 3.

FIG. 6 shows the process performed by the searching and retrieval system 104 of FIG. 3 for searching and retrieving the digital images from the image database 103. As can be seen from FIG. 6, at the step 401, the image database or databases from which the search is to be conducted are selected. At the step 402, the content data of all the digital images stored in the selected database or databases are retrieved. In one embodiment, the content data of an image also include a low resolution version of the image that functions as an icon of the image. Alternatively, the content data do not include such icons.

At the step 403, the user-defined query content data (i.e., the content data 130 or the content data of the digital image 131 of FIG. 3) are sent to the search and retrieval engine 104. Then the query content data are compared with the stored content data. Any stored content data matching or similar to the query content data are identified and their corresponding images retrieved at the step 405. Alternatively, the search engine 104 of FIG. 3 only sends the icon data of those matching content data to the user interface 101 for display. At step 406, it is determined if more queries are received for comparison. Alternatively, only the references to the matching images are sent to the user interface 101. In this case, the icon data or image data are sent later when display of these images is requested. If not, the process ends at the step 407. Otherwise, the steps 403–405 are repeated.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A digital image management system, comprising:
   (A) a content analyzer that analyzes an input image to extract content data from the image, wherein the content data include face feature data, color data, and texture data of the entire image, as well as shape and position data of objects within the image, wherein the content analyzer further comprises
   a neural network-based face detection system that detects if the image contains a face;
   a principle component analysis system that computes the face feature data from the detected face within the image by (1) standardizing the face and (2) projecting the standardized face into an Eigen face in order to compute the face feature data, wherein the computed face feature data are not a low resolution sub-image of the detected face;
   an image content analysis system that extracts the color data, texture data of the image, and shape and position data of objects within the image;
   (B) an image database coupled to the content analyzer to store pixel data of each of a plurality of images and the content data of each of the images associated with that image;
   (C) a search engine coupled to the image database and the content analyzer to compare the content data of the images with the content data of the input image such that any image similar to the input image can be identified from the image database without retrieving the pixel data of the image from the image database, wherein the search engine combines the face feature data of the input image with the color data, the texture data, and the shape and position data of the image to search the image database.

2. The digital image management system of claim 1, wherein the neural network-based face detection system detects if the image contains a face by dividing the image into a plurality of small windows and determining whether each of the windows contains a face, wherein the image may includes a plurality of faces.

3. The digital image management system of claim 1, wherein the principle component analysis system extracts the face feature data of the face by normalizing the face into a standardized face such that eyes of the standardized face lie at predetermined locations in a reference map, and then computing the face feature data corresponding to the standardized face.

4. The digital image management system of claim 3, wherein the principle component analysis system normalizes the face into the standardized face by translating, scaling, and rotating the face and by adjusting brightness and contrast of the face.

5. The digital image management system of claim 1, wherein the image content analysis system extracts color percentage, color layout, and texture of the image to extract the color and textual data.

6. The digital image management system of claim 1, further comprising a user interface that displays the input image, wherein when the input image includes a plurality of faces, the user interface allows a user to select at least one of the faces within the image to be searched by the search engine.

7. The digital image management system of claim 1, further comprising an auto-annotation module coupled to the search engine to associate personal information of a first face within a first image stored in the image database with a second image having a second face that is similar to the first face of the first image.

* * * * *